J. P. BEVER.
MARKER.
APPLICATION FILED JULY 11, 1913.
1,115,381.
Patented Oct. 27, 1914.
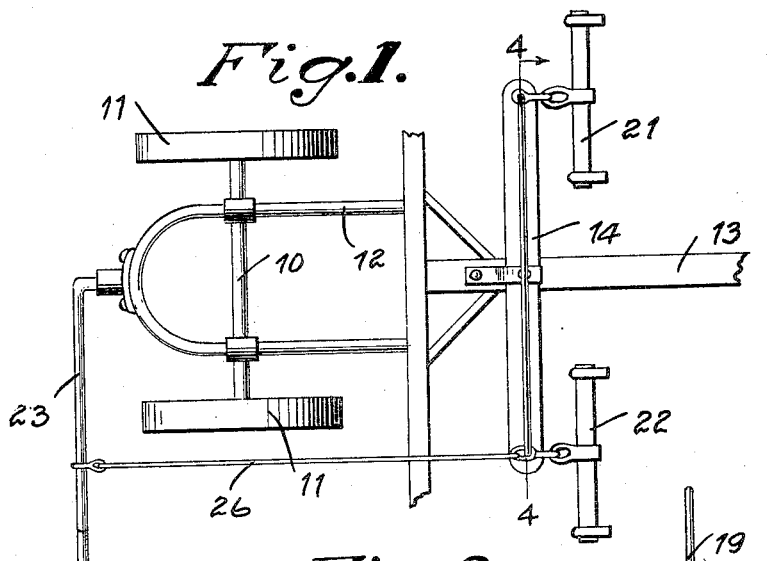
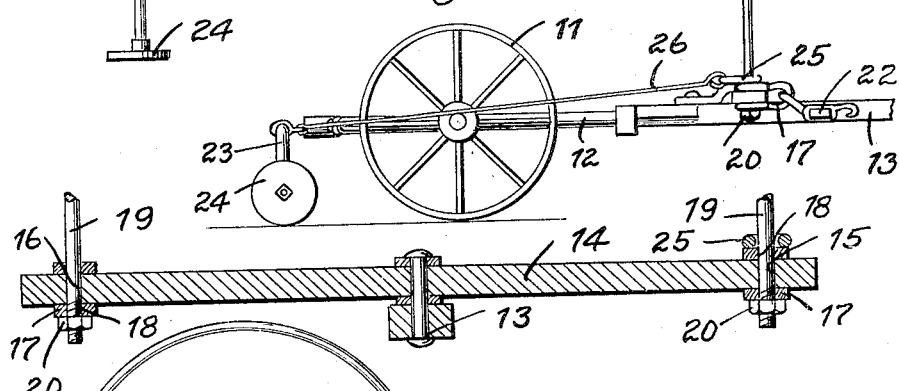
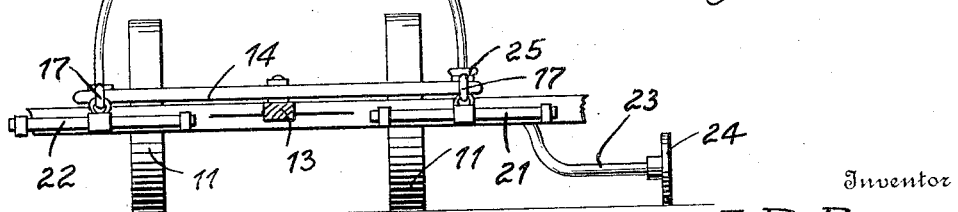
Witnesses
M. S. Watson
Henry P. Bright
Inventor
J. P. Bever
By Chandler & Chandler
Attorneys

UNITED STATES PATENT OFFICE.

JOHN P. BEVER, OF ALLERTON, ILLINOIS.

MARKER.

1,115,381. Specification of Letters Patent. Patented Oct. 27, 1914.

Application filed July 11, 1913. Serial No. 778,601.

*To all whom it may concern:*

Be it known that I, JOHN P. BEVER, a citizen of the United States, residing at Allerton, in the county of Vermilion, State of Illinois, have invented certain new and useful Improvements in Markers; and I do hereby declare the following to be a full, clear, and exact description of the invention, such as will enable others skilled in the art to which it appertains to make and use the same.

This invention relates to markers and particularly to an improved construction for incorporating the draft apparatus and the marker in the complete machine.

The object of the invention resides in the provision of an improved construction of draft apparatus for marks whereby all side draft is eliminated with the result that the machine will travel in a straight line.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a plan view of the sulky frame and draft portions of a marker constructed in accordance with the invention; Fig. 2, a side view of what is shown in Fig. 1; Fig. 3, a front view of what is shown in Fig. 1 with the marker disposed on the opposite side of the machine, and Fig. 4, a section on the line 4—4 of Fig. 1.

Referring to the drawing 10 indicates the axle of a marker which has rotatably mounted on the ends thereof wheels 11. This axle 10 supports the usual frame 12 and carried by the latter is the inner end of a draft tongue 13. Pivotally mounted upon the draft tongue 13 is a double tree 14 having passages 15 and 16 formed in the ends thereof respectively. Disposed at each end of the double tree 14 is a clevis 17 and the free ends of the arms of each clevis are provided with alined openings 18 and disposed in embracing relation to the double tree 14 with said openings in registration with the passages 15 and 16 respectively. Engaged through registering openings 18 and passages 15 and 16 respectively are the terminals of a vertical arch member 19 constituting the pivotal connection of respective clevises 17 with the double tree 14.

It will be noted that the terminals of the arch member 19 have threaded thereon nuts 20 whereby said terminals are held against longitudinal movement in registering openings 18 and passages 15 and 16. Secured to one of the clevises 17 is a swingle tree 21, while a swingle tree 22 is secured to the other clevis 17. Pivotally connected to the rear end of the frame for movement in a vertical plane extending transversely of the frame 10 is a marker arm 23 which has journaled on the free end thereof a marking wheel 24. Slidably engaged on the arch 19 is a ring 25 which is connected to the arm 23 at an intermediate point in the latter by a suitable link 26. By this construction it will be apparent that the arm 23 can be readily swung to dispose the marking wheel 24 on one side of the machine or the other.

What is claimed is:—

In a marker, the combination of a wheeled frame, a draft tongue supported by said frame at the front of the latter, a double tree pivoted on said tongue, clevises at the terminals of said double tree, a vertical arch member having its terminals engaged through openings in the clevises and through passages in the double tree and constituting a pivotal connection for securing the clevises to the double tree, a marker arm pivoted on the frame, a link connecting the double tree and marker arm and extending parallel to the line of travel, and a marker wheel journaled in the free end of said arm.

In testimony whereof, I affix my signature, in the presence of two witnesses.

JOHN P. BEVER.

Witnesses:
 H. W. SIX,
 M. PHALEN.

---

Copies of this patent may be obtained for five cents each, by addressing the "Commissioner of Patents, Washington, D. C."